J. E. WIGGIN,
Assignor, by mesne assignments, to L. S. Cox.
Sewing-Machine and Trimming Device therefor.
No. 9,056. Reissued Jan. 20, 1880.
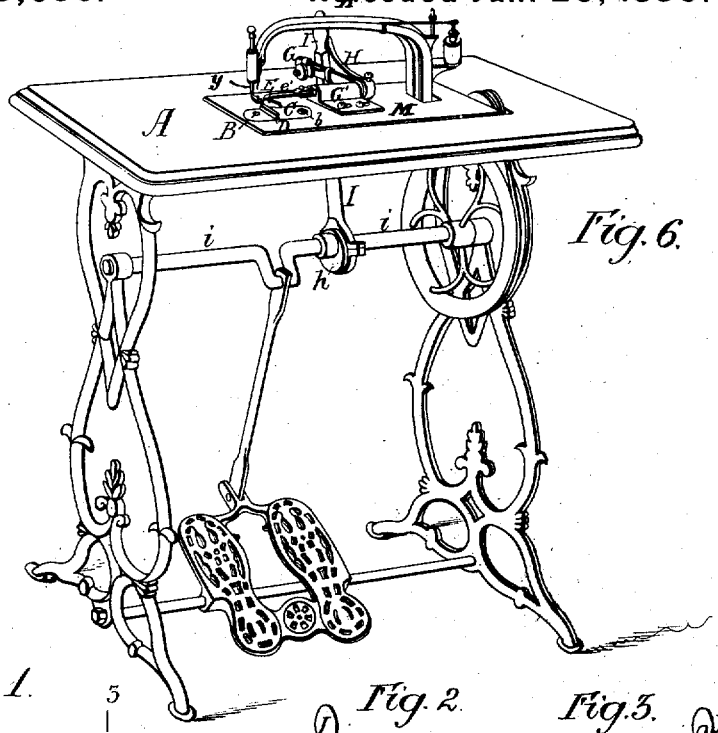
Fig. 6.
Fig. 1.
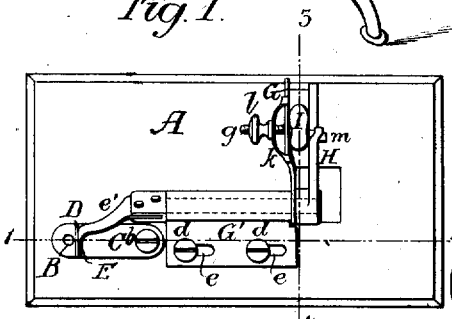
Fig. 2.
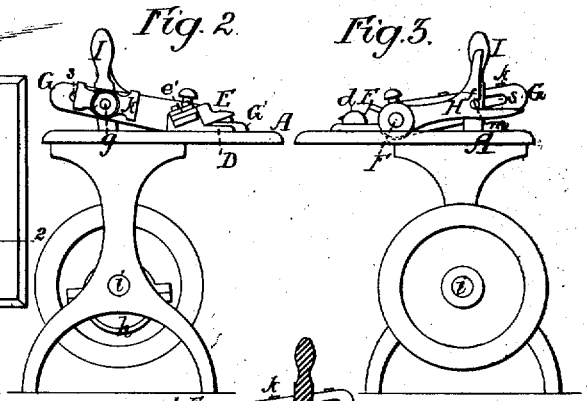
Fig. 3.
Fig. 4.
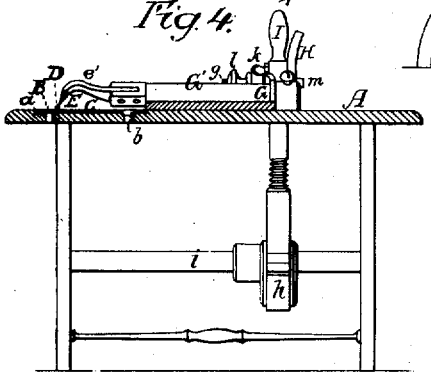
Fig. 5.
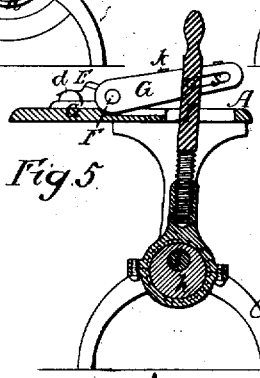
Inventor
John E. Wiggin
by his Attorneys
Howson and Son
Witnesses Alexander Pattison
Harry Smith

UNITED STATES PATENT OFFICE.

JOHN E. WIGGIN, OF STONEHAM, MASSACHUSETTS, ASSIGNOR, BY MESNE ASSIGNMENTS, TO LEWIS S. COX, OF PHILADELPHIA, PENNSYLVANIA.

SEWING-MACHINE AND TRIMMING DEVICE THEREFOR.

SPECIFICATION forming part of Reissued Letters Patent No. 9,056, dated January 20, 1880.

Original No. 139,525, dated June 3, 1873. Application for Reissue filed November 6, 1879.

*To all whom it may concern:*

Be it known that I, JOHN E. WIGGIN, of Stoneham, county of Middlesex, and State of Massachusetts, have made a new and useful invention having reference to Sewing-Machines, whereby cloth may be sewed and sheared at one and the same time automatically; and I do hereby declare the same to be fully described in the following specification, and represented in the accompanying drawings, in which—

Figure 1 denotes a top view; Figs. 2 and 3, opposite end elevations of a sewing-machine table provided with my invention; Fig. 4, a vertical section on line 1 2, Fig. 1; Fig. 5, a transverse vertical section on the line 3 4, Fig 1; and Fig. 6, a perspective view of a sewing-machine with my cutting and trimming attachment applied thereto.

My invention consists of the combination, with an organized sewing-machine having a work-plate and a presser-foot, of shears arranged substantially as described hereinafter, and with mechanism for actuating the shears or one blade thereof, whereby the edge of the fabric may be trimmed parallel with the line of stitches simultaneously with the formation of the same.

In the drawings, A′ is an organized sewing-machine provided with the usual presser-foot *y*, and a bed or work plate on which to place the fabric to be operated on. B is the needle-hole, which, in the present instance, is represented as being made through the bed-plate M and through a work-plate, C, separate from the said bed-plate, the plate C being confined in place by a set-screw, *b*.

Near the needle-hole B in the plate C there is, on the latter, a stationary blade, D, to operate in combination with a vibrating blade, E, carried by an arm, *e′*, secured to a rock-shaft, F, which is adapted to a bearing in an adjustable plate, G′, secured to the table by set-screws *d d*, which pass through elongated slots *e e* in the plate, and are screwed into the table.

It will be seen that the adjustability of the plate G′ permits the adjustment of the blade E into close contact with the stationary blade D.

The object of having the stationary blade fixed upon a detachable plate, C, and the blade E adjustable in the manner described, is to permit the application to the table of different plates having blades D at different distances from the needle-holes, and to move the blade E into proper contact with the blade of any one of a number of plates, as some kinds of work may need to be trimmed nearer to or farther from the line of sewing than others. The lower shear may, however, be fixed to a plate separate from the needle-hole plate, and be adjustable thereon, so as to vary the distance between the needle-hole and the blade.

From the rear end of shaft F there projects an arm, H, provided with a notch, *f*, as represented in Fig. 3, and from the same shaft extends another arm, G, which is loose on the said shaft and is slotted lengthwise at *s*, to receive a screw-pin, *g*, projecting from a rod, I, adapted to an eccentric, *h*, fixed upon the driving-shaft *i* of the sewing-machine. The screw-pin *g* passes through a bowed spring, *k*, applied to one side of the arm G, and a nut, *l*, adapted to the screw-pin *g* and bearing against the spring, serves to regulate the pressure of the latter against the arm G.

A stud, *m*, extending from the rod I, may, by operating the rod I, be moved into or out of the notch *f*. When the stud *m* is in the notch *f*, and the driving-shaft is turned, an oscillating motion will be imparted to the shaft F, and consequently to the blade E, carried by the shaft, and this blade, in conjunction with the blade D, will operate with a shearing effect on the fabric, which will be trimmed along its edge in a direction parallel with the range of stitches as the fabric is being sewed by the machine.

I claim as my invention—

1. The combination, with an organized sewing-machine having a work-plate and a presser-foot, of shears arranged with respect to the needle and needle-hole substantially as described, and with mechanism for actuating the said shears, whereby the edge of the fabric may be trimmed parallel with the line of stitches simultaneously with the formation of the same, all substantially as set forth.

2. The combination, in a sewing-machine, of a fixed plate, D, a rock-shaft, F, carrying the blade E, an arm on the said shaft, and mechanism whereby the said arm is vibrated from a rotating shaft of the said sewing-machine, substantially as described.

3. The shaft F, eccentric *h*, rod I, having a stud, *m*, and mechanism for operating said eccentric, with the screw *g*, nut *l*, spring *k*, slotted arm G, and notched arm H, all combined and operating in the manner specified.

In testimony whereof I have signed my name to this specification in the presence of two subscribing witnesses.

JOHN E. WIGGIN.

Witnesses:
ONSLOW GILMORE,
MYRON W. MESSER.